United States Patent
Tei et al.

[11] Patent Number: 6,096,694
[45] Date of Patent: Aug. 1, 2000

[54] LIQUID LUBRICANT, MAGNETIC RECORDING MEDIUM USING THE SAME, AND METHOD FOR MANUFACTURING MAGNETIC RECORDING MEDIUM

[75] Inventors: Youichi Tei; Shinji Shirai; Yoshimasa Hattori, all of Nagano, Japan

[73] Assignee: Fuji Electric Co., Ltd., Japan

[21] Appl. No.: 09/169,388

[22] Filed: Oct. 9, 1998

[30] Foreign Application Priority Data

Oct. 9, 1997 [JP] Japan ..................... 9-277567
May 29, 1998 [JP] Japan ..................... 10-150158

[51] Int. Cl.[7] .................. B32B 27/00; G11B 5/00
[52] U.S. Cl. .................. 508/562; 428/421; 428/422; 428/695; 428/900
[58] Field of Search ............................. 508/562

[56] References Cited

U.S. PATENT DOCUMENTS

| | | | |
|---|---|---|---|
| 5,039,438 | 8/1991 | Thermet et al. | 508/562 |
| 5,169,548 | 12/1992 | Strepparola et al. | 508/562 |
| 5,252,400 | 10/1993 | Mizuno et al. | 508/562 |
| 5,435,927 | 7/1995 | Beckwith et al. | 508/562 |

FOREIGN PATENT DOCUMENTS

0319942A2  6/1989  European Pat. Off. .
2-000247  1/1990  Japan .

*Primary Examiner*—Ellen M. McAvoy
*Attorney, Agent, or Firm*—Rossi & Associates

[57] ABSTRACT

A perfluoropolyether liquid lubricant is provided which has an amine functional group at at least one of ends of a chain molecule. A magnetic recording medium using the lubricant assures increased bonding force between a carbon protective layer and a lubricant layer.

6 Claims, 1 Drawing Sheet

6,096,694

LIQUID LUBRICANT, MAGNETIC RECORDING MEDIUM USING THE SAME, AND METHOD FOR MANUFACTURING MAGNETIC RECORDING MEDIUM

FIELD OF THE INVENTION

The present invention relates to a magnetic recording medium using a liquid lubricant, which is installed in an external storage device or memory of a computer, and a method for manufacturing such a recording medium. In particular, the invention is concerned with a desirable liquid lubricant with which the top layer of the magnetic recording medium is coated.

BACKGROUND OF THE INVENTION

A typical structure of a magnetic recording medium (magnetic disc) for use with a fixed magnetic disc drive is shown in FIG. 1 by way of example. To produce the recording medium, a non-magnetic substrate 11 formed of Al—Mg alloy is plated with Ni—P by electroless plating or deposition, to form a non-magnetic metal layer 12, so as to provide a non-magnetic base 1 consisting of the non-magnetic substrate 11 and the non-magnetic metal layer 12. After a non-magnetic metal base layer 2 is laminated on the non-magnetic base 1, a magnetic layer 3 in the form of a thin film made of a ferromagnetic alloy, such as Co—Cr—Ta or Co—Cr—Pt, is laminated on the metal base layer 2, and a carbon protective layer 4 is formed on the magnetic layer 3. The carbon protective layer 4 is then coated with a liquid lubricant which provides a lubricant layer 5. In this manner, a magnetic disc as shown in FIG. 1 is formed.

The non-magnetic base 1 may be selected from an alumite base, a glass base, a ceramic base, and others. The base 1 is formed with minute protrusions and recesses by texturing after it is polished, and the non-magnetic metal base layer 2 made of Cr is formed on the base 1 by sputtering in an Ar atmosphere while the base 1 is being heated to about 200° C. In addition, the magnetic layer 3, and the carbon protective layer 4 made of amorphous carbon are successively formed on the non-magnetic metal base layer 2. The carbon protective layer 4 is then coated with a perfluoropolyether lubricant, to thus provide the magnetic recording medium.

The magnetic recording medium or disc fabricated in the above manner is installed in a fixed magnetic disc drive. When the magnetic disc is rotated in the operation of the magnetic disc drive, the disc is repeatedly brought into contact with a recording head of the disc drive while being rotated at a constant speed. Namely, a CSS (contact start/stop) system is employed wherein the magnetic disc drive stops rotating the magnetic disc when the recoding head and the magnetic disc surface come into contact with each other, and when the disc drive starts operating, the recording head floats or flies slightly above the surface of the magnetic disc, so as to read and write information. In this system, the recording head is held in contact with the magnetic disc surface for most of the time, and is brought into a non-contact state (where the recording head slightly floats above the magnetic disc) only when the disc drive is operating. Due to the sliding movement of the recording head relative to the magnetic disc, friction occurs between the head and the surface of the magnetic disc. In order to protect the magnetic layer 3 from such friction and other problems, the carbon protective layer 4 and the lubricant layer 5 are formed on the magnetic layer 3.

In the magnetic disc as described above, the protective layer is generally made of carbon, which is often formed into a film by sputtering or CVD in an Ar atmosphere. One of the reasons why carbon is used as a material for forming the protective layer is that an amorphous carbon layer formed by sputtering has relatively strong graphitic properties, and therefore shows a relatively low coefficient of friction in the atmosphere containing water, which is a typical property of graphite.

The carbon protective layer, however, is likely to wear due to its relatively low hardness as compared with a ceramic material, such as $Al_2O_3.TiC$ or $CaTiO_3$, which is used for forming a slider of a thin-film head or MIG head, and the wear of the protective layer may result in head crush in some cases. To solve this problem, studies have been made in an attempt to develop protective layer having sufficiently high hardness. In recent years, there have been widely used protective layers formed of diamond-like carbon (DLC) having properties similar to those of diamond having extremely high hardness, or those formed by adding a small amount of N or Si to amorphous carbon or diamond-like carbon. In the diamond-like carbon protective layer, the proportion of carbon atoms bonded in a diamond structure is higher than that of carbon atoms bonded in a graphite structure.

The lubricant layer that provides the top layer of the magnetic disc needs to be stably formed with uniform thickness on the surface of the protective layer. It is also important that the lubricant layer exhibit high adhesiveness and bonding strength with the protective layer. To increase the adhesiveness, a lubricant layer has been proposed which is composed of perfluoropolyether having various types of polar group at a molecular end or ends.

The perfluoropolyether lubricant has a poor lubricating characteristic if its molecular weight is too low, and tends to adhere to the recording head if the molecular weight is too high. Thus, perfluoropolyether lubricants having the weight average molecular weight (Mw) of 1500 to 5500 have been conventionally used.

The perfluoropolyether lubricants which have been conventionally used include those containing an aromatic ring or its derivative as a polar group at a molecular end or ends (for example, FOMBLIN AM2001 available from Ausimont S.p.A., and DEMNUM-SP available from Daikin Industries, Ltd.), those containing a hydroxyl group as an end polar group (for example, FOMBLIN Z-DOL or Z-Tetraol available from Ausimont S.p.A., and DEMNUM-SA available from Daikin Industries, Ltd.), and those containing a carboxyl group as an end polar group (for example, FOMBLIN Z-DIAC available from Ausimont S.p.A., DEMNUM-SH available from Daikin Industries, Ltd., and KRYTOX-FS available from DuPont, Japan).

With a rapidly increasing demand for high-density recording in recent years, the fly height of the magnetic head above the magnetic disc has been reduced, and a low-height fly head, such as Tri-pad head or Tri-omega head, has been increasingly employed in place of known TPC head. With the fly height thus reduced, a negative pressure is likely to be generated between the magnetic head and the magnetic disc when the magnetic head slides above the surface of the magnetic disc that is rotating at a high speed, with a result of transfer of the lubricant from the magnetic disc surface to the magnetic head. If the lubricant is transferred onto the magnetic head, the head is contaminated, and flying characteristics of the magnetic head are disturbed (for example, the fly height is increased), resulting in reduction of the reproduction output. If a large amount of the lubricant is transferred to the magnetic head, so-called fly-stiction (adhesion of the head) occurs when the magnetic head re-starts operating after it is stopped for a while.

As the recording density and speed increase, the rotating speed of the magnetic disc in the disc drive increases from a conventional speed, i.e., 3600 rpm, to a considerably high speed, i.e., 7200 to 10000 rpm. As a result, a phenomenon called "spin migration" is likely to appear, namely, the lubricant on the magnetic disc surface moves or dissipates toward a radially outer portion of the disc due to a centrifugal force. If the degree of migration becomes large, head crush may occur in a radially inner portion of the disc, or adhesion of the head to the magnetic disc (fly stiction) may occur in the radially outer portion of the disc.

In the meantime, magnetic disc drives used in these days have a completely enclosed structure in which the interior space of the disc drive is isolated or sealed from the exterior. If such a magnetic disc drive is used under a condition of high humidity, gas generated from internal components of the disc drive fills the interior space, and the concentration of the gas is increased. The gas component thus generated is dissolved into water produced due to high humidity or dew formation, thereby to produce a harmful acid gas, which eventually acts on the surface of the magnetic disc.

On the other hand, the surface of the carbon protective layer is covered with a thin oxide film having a functional group, such as reactive carbonyl group, carboxyl group, or hydroxyl group, and the above-indicated polar functional group at a chain end of the liquid lubricant is bonded to and reacts with the functional group of the oxide film. Under a high-humidity environment where water is present, however, the degree of interaction between these functional groups is reduced, and the harmful acid gas as described above actively adheres to portions of the disc surface where the bonding strength is reduced. Further, the material of the recording head is more likely to undergo a catalytic action or generate heat due to friction, through contact recording with reduced fly height of the magnetic head. The deposition of the acid gas on the disc surface, combined with the catalytic action or heat due to friction, accelerates decomposition of a main chain portion (ether portion) of the perfluoropolyether lubricant. Substances resulting from the decomposition, or corrosive components of the gas, or the like, deposited on the disc surface, are transferred to the surface of the magnetic head, and the fly characteristic of the magnetic head is disturbed or deteriorated, thus causing reduction in the reproduction output. In addition, the perfluoropolyether lubricant thus decomposed cannot maintain its lubricating characteristic, thereby causing wear of the protective film, and in the worst case, head crush takes place.

Although various attempts have been made to produce magnetic discs using perfluoropolyether lubricants with various types of polar functional group, so as to solve the above-described problems, such a magnetic disc that meets with all of the above demands had not been developed.

SUMMARY OF THE INVENTION

It is therefore an object of the present invention to provide a perfluoropolyether lubricant to be applied to a surface of a carbon protective layer of a magnetic recording medium, wherein each molecule of the lubricant contains a highly reactive polar functional group at an end of its chain structure. It is also an object of the invention to provide a liquid lubricant which achieves a stable lubricating characteristic for a prolonged time, a magnetic recording medium using the liquid lubricant, and a method for manufacturing the magnetic recording medium, wherein the bonding strength between the perfluoropolyether liquid lubricant and the surface of the protective layer is further increased, so that the lubricant or its decomposed substance is prevented from transferring from the magnetic disc surface onto the magnetic head during sliding movement of the head with a reduced fly height, or during the operation of the disc drive in an high-temperature, high-humidity environment, and wherein migration of the lubricant does not occur during high-speed rotation of the disc, and wear of the protective layer is avoided.

To accomplish the above object, the present invention provides a liquid lubricant comprising perfluoropolyether having a main chain structure which is represented by one selected from a group consisting of general formulas (1), (2) and (3), the perfluoropolyether having an amine functional group at at least one end of a chain molecule. The general formula (1) is expressed by:

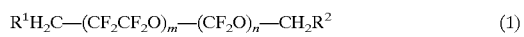

where $R^1$ and $R^2$ are the same functional group or different functional groups, and each of m and n is an integer. The general formula (2) is expressed by:

where $R^3$ is a functional group, and m is an integer. The general formula (3) is expressed by:

where $R^4$ is a functional group, and m is an integer.

The amine functional group may have a tertiary amine structure represented by one of formula (4) and formula (5), and shows a weak basicity. The formula (4) is expressed by

where $R^5$ and $R^6$ are the same functional group or different functional groups, and $R^5$ and $R^6$ may be bonded to each other to form a cycle, while n is 0 or an integer. The formula (5) is expressed by:

where $R^7$ and $R^8$ are the same functional group or different functional groups, and $R^7$ and $R^8$ may be bonded to each other to form a cycle, while each of l, m, n is 0 or an integer.

The amine functional group may be a functional group containing at least one selected from a group consisting of aromatic ring, aromatic amine, aromatic diamine, heterocycle, heterocyclic amine, alicyclic hydrocarbon, alicyclic amine and aliphatic amine.

The perfluoropolyether liquid lubricant as described above may have a weight average molecular weight of 1500 to 15000.

The present invention also provides a magnetic recording medium comprising: a magnetic layer; a carbon protective layer formed on the magnetic layer, and a liquid lubricant layer formed on the carbon protective layer, the liquid lubricant layer being formed of the perfluoropolyether liquid lubricant as described above.

In the magnetic recording medium of the present invention, the perfluoropolyether liquid lubricant may contain a bonded perfluoropolyether lubricant that is strongly bonded to the carbon protective layer, and a mobile lubricant that is weakly bonded to the carbon protective layer. In this case, the bonded perfluoropolyether lubricant is contained in a proportion of 30 to 100% with respect to a total amount of the lubricant.

The present invention further provides a method for manufacturing a magnetic recording medium comprising the steps of: forming a Cr under-coating layer on a non-magnetic base by sputtering; forming a Co alloy magnetic layer on the Cr under-coating layer; forming a carbon protective layer on the Co alloy magnetic layer by sputtering or CVD; coating a surface of the carbon protective layer with the liquid lubricant as described above, by dipping or spin coating; and heating or irradiating with ultraviolet rays the surface of the carbon protective layer that has been coated with the liquid lubricant.

BRIEF DESCRIPTION OF THE DRAWING

The invention will be described in greater detail with reference to preferred embodiments thereof and the accompanying drawing, wherein:

A single FIGURE is a schematic perspective view showing a layered structure of a known magnetic recording medium.

DETAILED DESCRIPTION OF THE INVENTION

Figure 1:
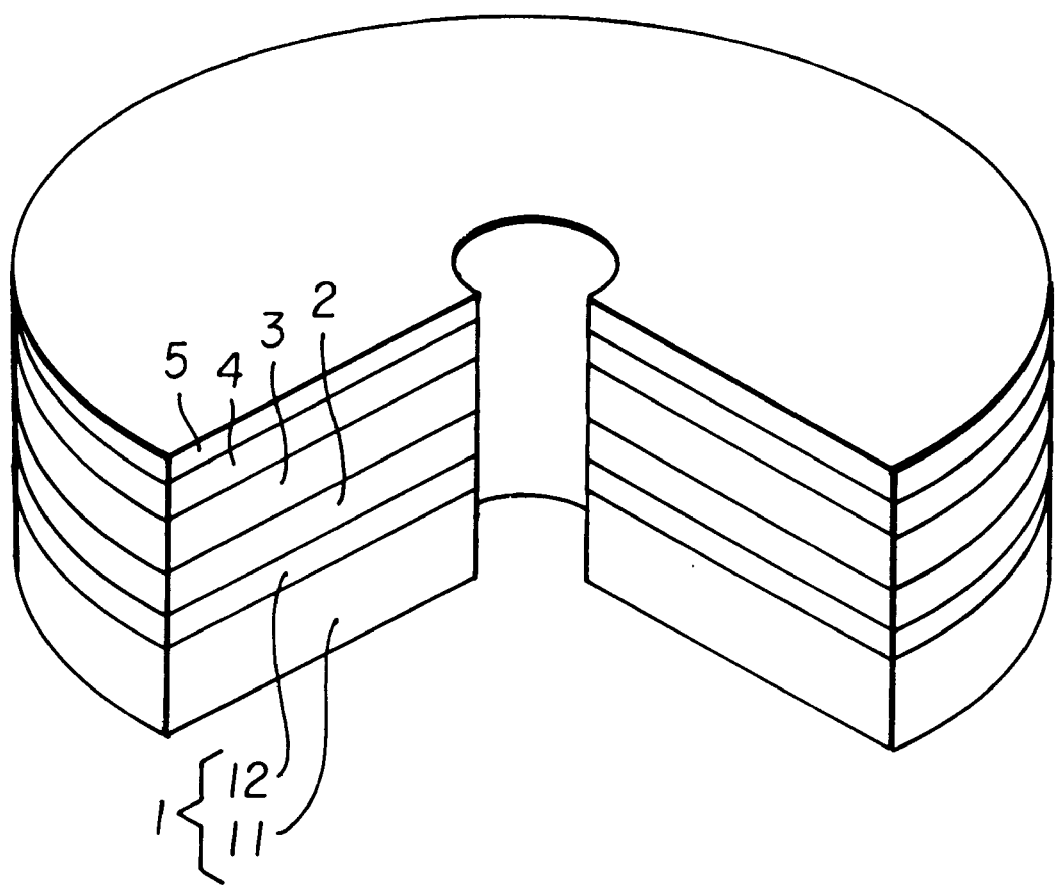

The liquid lubricant of the present invention consists of a perfluoropolyether lubricant having a polar functional group at at least one of ends or terminals of each chain molecule. The surface of the carbon protective layer is covered uniformly with a thin oxide film having a functional group, such as reactive carbonyl group, carboxyl group, hydroxyl group. To provide a lubricant layer having excellent adhesiveness and bonding strength with the surface of the carbon protective layer showing weak acidity, it is most desirable to use a perfluoropolyether lubricant having a polar functional group showing weak alkalinity.

What is important here is what types of polar functional groups showing weak alkalinity are to be selected. While amine is considered as a typical example of functional group showing weak alkalinity, primary amine or secondary amine has relatively strong alkalinity, and the bonding strength of the lubricant is significantly increased where the perfluoropolyether lubricant containing the first-class or secondary amine is applied to the surface of the protective layer. However, the lubricant containing first- or secondary amine is likely to attract harmful acid gas in the atmosphere or within the disc drive, thus causing phenomena, such as decomposition of the lubricant or transfer of contaminants onto the magnetic head, which result in reduced reproduction output or head crush. Also, perfluoropolyether having first-class or secondary amine as a polar functional group at an end(s) of its chan molecule is an unstable substance, and the properties of the lubricant may be modified when it is heated or left for a long time at room temperature.

For the reasons stated above, tertiary amine is favorably used as a polar functional group showing weak alkalinity. Preferred examples of tertiary amine are expressed by following formulas:

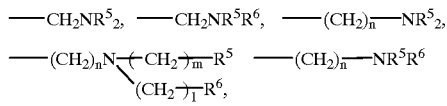

where $R^5$ and $R^6$ represent functional groups that may be bonded or joined to each other to form a cycle, and each of l, m, n represents 0 or an integer greater than 0.

To further increase the adhesiveness (physical adsorption) between the carbon protective layer and the lubricant layer, it is desirable that the substituent derivatives $R^5$, $R^6$ of tertiary amine contain a substitutional group in the same functional group, which substitutional group has a conjugated bond having a graphite structure of the carbon protective layer and $\pi$—$\pi$ electron interaction.

The weak alkaline tertiary amine functional group may be selected from aromatic ring, aromatic hydrocarbon, aromatic amine, aromatic diamine, and other aromatic derivatives, heterocycle, heterocyclic hydrocarbon, heterocyclic amine, heterocyclic diamine, and other heterocyclic derivatives, aliphatic hydrocarbon, aliphatic amine and other derivatives, and alicyclic hydrocarbon, alicyclic amine and other derivatives, each of which may comprise a sub-structure of the weak alkaline tertiary amine functional group as shown below.

Some structural formulas of weak alkaline three-class amine functional groups are shown below.

<Including Aromatic Ring>

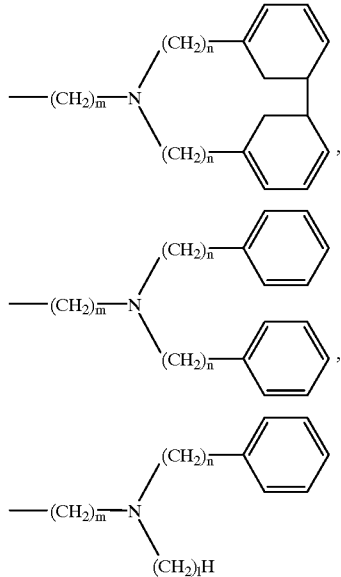

where l, m, n=0, or an integer equal to or greater than 1.
<Including Aromatic Amine>

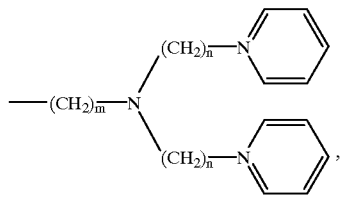

-continued

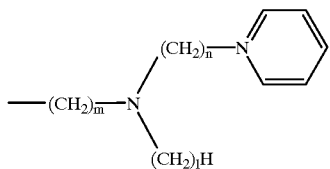

where l, m, n=0, or an integer equal to or greater than 1.
<Including Heterocycle>

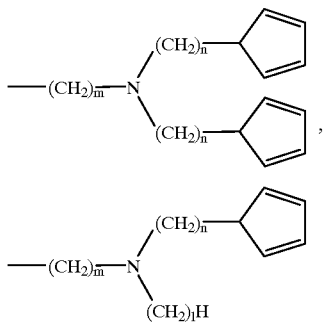

where l, m, n=0, or an integer equal to or greater than 1.
<Including Heterocyclic Amine>

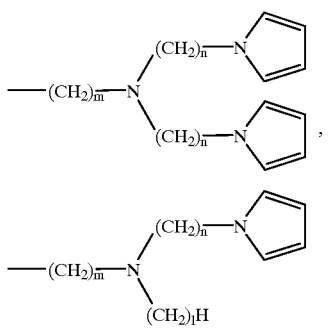

where l, m, n=0, or an integer equal to or greater than 1.
<Including Aliphatic Compound, Aliphatic Amine (Derivatives)>

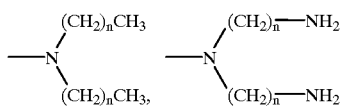

where n=0, or an integer equal to or greater than 1.
<Including Alicyclic Hydrocarbon, Alicyclic Amine (Derivatives)>

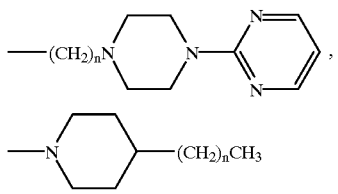

-continued

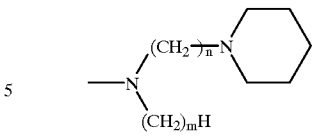

where m=0, 1, 2, and n=0 or an integer equal to or greater than 1.

Where the known perfluoropolyether liquid lubricant is used as a lubricant for a magnetic disc, its weight average molecular weight (Mw) is preferably controlled to within a range of 1500 to 5500. If the molecular weight of the perfluoropolyether liquid lubricant is too small, the chain molecule has a reduced length, and the coefficient of friction of the lubricant) is undesirably increased. If the molecular weight is too large, the length of the chain molecule on the side of its free end becomes excessively large, and the adhesion effect of the polar functional group is relatively weakened, whereby adhesion of the magnetic head to the lubricant layer (fly stiction) is more likely to occur.

The perfluoropolyether liquid lubricant having the above-indicated tertiary amine as a functional group at an end or ends of a chain molecule is far more strongly bonded to the carbon protective layer, as compared with a conventional lubricant having a known functional group at an end(s) of a chain molecule. Accordingly, adhesion of the head to the magnetic disc does not occur even if the weight average molecular weight (Mw) is in a relatively high range of 1500 to 15000, and the magnetic recording medium is less likely to wear even when used with a low-fly-height contact head, such as Tri-Pad head or Tri-Omega head, thus assuring good lubricating capability.

To ensure a high bonding strength of perfluoropolyether with the surface of the carbon protective layer, the ratio of a bonded lubricant that is strongly bonded to the surface of the carbon protective layer to a mobile lubricant that is weakly bonded is preferably controlled so that the proportion of the bonded lubricant is in a range of 30 to 100% with respect to the whole amount of the lubricant.

The magnetic recording medium of the present invention may be fabricated in the same manner as in the known example shown in FIG. 1. Namely, a base layer and an alloy magnetic layer are formed in this order on a non-magnetic substrate, and a carbon protective layer is formed on the resulting laminar structure. Then, the perfluoropolyether liquid lubricant layer as described above is formed on the carbon protective layer. According to the present invention, any of the following three methods for forming the carbon protective layer and lubricant layer may be employed.

In the first method, the surface of the carbon protective layer is coated with the perfluoropolyether lubricant by dipping or spin coating. In this case, the proportion of the bonded lubricant is controlled to be 30% or higher. In the second method, the surface of the carbon protective layer is coated with the perfluoropolyether liquid lubricant, and then the coated surface is subjected to heat treatment, to accelerate bonding of the lubricant layer with the carbon protective layer, so that the proportion of the bonded lubricant is controlled to a certain value in a range of 30 to 100%. In the third method, the surface of the carbon protective layer is coated with the perfluoropolyether liquid lubricant, and then the coated surface is irradiated with ultraviolet rays for accelerating bonding of the lubricant layer with the carbon protective layer, so that the proportion of the bonded lubricant is controlled to a certain value in a range of 30 to 100%.

Synthesis Example

The perfluoropolyether liquid lubricant of the present invention can be produced according to a synthesis method as described below. It is, however, to be understood that the present invention is not limited to the following method.

Initially, perfluoropolyether (for example, FOMBLIN Z-DOL available from Ausimont S.p.A) having a hydroxyl group (—OH) as a functional group at an end of a chain molecule is caused to react at a low temperature with trifluoromethanesulfonic anhydride in the presence of a base by an ordinary method, so as to form triflate. In the following reaction formula, $R_f$ represents a perfluoropolyether chain.

Reaction Formula: $R_f(CH_2OH)_2+(CF_3SO_2)_2O \rightarrow R_f(CH_2OSO_2CF_3)_2$ The obtained triflate is caused to react with an amino compound according to the formula below, to provide a desired perfluoropolyether liquid lubricant having amine at an end(s) of chain molecule according to the present invention.

$R_f(CH_2OSO_2CF_3)_2+H—A \rightarrow R_f(CH_2A)_2$ where A represents a weak alkaline tertiary amine functional group, and HA is weak alkaline secondary amine.

EXAMPLES

Some examples of specific methods for synthesizing the perfluoropolyether liquid lubricant of the present invention will be now described.

Synthesis Example 1

Synthesis of Pyrimidinylpiperazine-Modified Perfluoropolyether (II)

(a) Trifluoromethylsulfonation 1.0 g of trifluoromethanesulfonic anhydride was dissolved into 30 ml of HCFC 225, to provide a solution which was added to a solution in which 10.0 g of FOMBLIN Z-DOL 4000 and 0.1 g of pyridine were dissolved in 80 ml of HCFC 225, and the resulting liquid was cooled down to 0° C. Then, the liquid was stirred for 10 hours while being kept at 0° C., and the terminal point of the reaction was confirmed by NMR. The liquid thus obtained was washed by pure water, and HCFC 225 was removed, to provide 8.8 g of triflate (I).

(b) Modification by Pyrimidinylpiperazine 5 g of triflate (I) obtained by the above reaction of trifluoromethylsulfonation, 0.8 g of pyrimidinylpiperazine, and 50 ml of HCFC 225 were put into an autoclave, for nitrogen substitution, and then caused to react with each other at 90° C. for 200 hours. It was confirmed by NMR that the materials put into the autoclave were not left as they were. The resulting substance was then washed by water and ethanol, to provide 2.1 g of perfluoropolyether (II) having pyrimidinylpiperazine at an end(s) of chain molecule.

A structure:

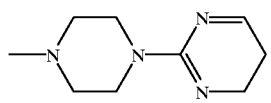

Synthesis Example 2

Synthesis of Piperidinylethylamine-Modified Perfluoropolyether (III)

5 g of triflate (I) obtained by the reaction (a) of trifluoromethylsulfonation in the synthesis example 1, 0.5 g of piperidinylethylamine, and 50 ml of HCFC 225 were put into an autoclave, for nitrogen substitution, and then caused to react with each other at 90° C. for 100 hours. It was confirmed by NMR that the materials put into the autoclave were not left as they were. The resulting substance was then washed by water and ethanol, to provide 2.1 g of perfluoropolyether (III) having piperidinylethylamine at an end(s) of chain molecule.

A structure:

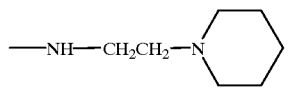

Synthesis Example 3

Synthesis of Diethylamine-Modified Perfluoropolyether (IV)

5 g of triflate (I) obtained by the reaction (a) of trifluoromethylsulfonation in the synthesis example 1, 0.4 g of diethylamine, and 50 ml of HCFC 225 were put into an autoclave, for nitrogen substitution, and then caused to react with each other at 90° C. for 100 hours. It was confirmed by NMR that the materials put into the autoclave were not left as they were. The resulting substance was then washed by water and ethanol, to provide 2.2 g of perfluoropolyether (IV) having diethylamine at an end(s) of chain molecule.

A structure

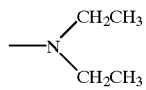

A method for fabricating the magnetic recording medium of the present invention will be now described. Initially, a non-magnetic substrate made of Al alloy (Al—Mg alloy) was prepared, and a non-magnetic layer having a thickness of 13 μm was formed by plating the non-magnetic substrate with Ni—P by electroless plating. Then, the surface of the non-magnetic layer was polished so that the surface roughness (Ra) became equal to 10 Å. Subsequently, grooves in the form of substantially concentric circles were formed by texturing using diamond slurry, so that the surface roughness (Ra) became equal to 30 Å. The substrate thus obtained was then washed, and a non-magnetic metal base layer made of Cr was formed with a thickness of 500 Å on the substrate within a sputtering apparatus, and a magnetic layer of $Co_{82}Cr_{14}Ta_4$ having a thickness of 300 Å and a diamond-like carbon (DLC) protective layer having a thickness of 120 Å were further formed on the metal base layer. The resulting structure was then subjected to tape burnishing, to provide a common medium which is coated with a liquid lubricant in the following manner.

Each of the novel perfluoropolyether liquid lubricants (perfluoropolyether (II), (III), (IV)) prepared in the above synthesis examples 1 to 3 was diluted, using fluorocarbon (for example, FC-77 available from Sumitomo 3M Limited, or ZS-100 available from Ausimont S.p.A.) as a solvent, so that the concentration of the lubricant became equal to 0.05% by weight. The resulting liquid was applied by spin coating at a rotating speed of 1800 rpm, so that a perfluoropolyether liquid lubricant layer was formed with a thickness of 20 Å on the medium prepared as described above, to thus produce each of magnetic recording media (Examples 1 through 60 shown in TABLE 1–3).

As shown in TABLE 4, some magnetic recording media (comparative examples 1 through 18) were also produced for comparison with those of the present invention, using perfluoropolyether (for example, FOMBLIN Z-DOL available from Ausimont S.p.A.) having alcohol at an end of chain molecule, or end group piperonyl-modified perfluoropolyether (for example, FOMBLIN AM001 available from Ausimont S.p.A.), which was applied by coating in the same manner as described above.

With respect to each of the thus obtained magnetic recording media of Examples 1 to 60 and Comparative Examples 1 to 18, the bonded ratio (or proportion of bonded lubricant) was obtained, and the coefficients of dynamic friction ($\mu_I$, $\mu_L$, CSS-$\mu_I$, CSS-$\mu$)$_L$ were measured. Also, contamination of the recording head used with each recording medium was observed, and a migration test and evaluation of adsorption of $SO_2$ were conducted. The obtained results are indicated in TABLE 1 through TABLE 4.

The bonded ratio indicated in TABLE 1 to TABLE 4 represents the proportion of a bonded lubricant that is strongly bonded to the carbon protective layer relative to a mobile lubricant that is weakly bonded to the protective layer. Where the lubricant is subjected to heat treatment or UV treatment after the coating step, the proportion of the bonded lubricant can be controlled as desired by controlling the heating temperature and time, or the wavelength and power of ultraviolet rays, amount of ozone generated, and UV irradiation time.

The proportion of the bonded lubricant in known lubricants shown as Comparative Examples (for example, FOMBLIN Z-DOL or AM2001 available from Ausimont S.p.A.) is 60 to 70% maximum. Thus, magnetic recording media using such known lubricants suffer from a problem of reduced durability, which results from spin migration due to dissipation of the lubricant during a high-speed rotation of the recording disc in a disc drive.

The lubricant of the present invention, on the other hand, establishes a strong chemical bond with C=O and COO- carbonyl groups that are present on the surface of the carbon protective layer, and also contains cyclic functional groups that exhibit strong interaction (physical adsorption) with the carbon surface. Thus, the proportion of the bonded lubricant can be easily controlled to a desired value in the range of 30 to 100% through the heat treatment or UV irradiation treatment.

The bonded ratio was obtained in the following manner. Initially, the C-F peak absorbance (namely, film thickness of lubricant layer) detected at 1290 to 1260 cm$^{-1}$ by FT-IR high-sensitive reflection method was obtained with respect to a medium coated with a perfluoropolyether liquid lubricant. Then, the medium was subjected to ultrasonic immersion in a solvent FC-77 for 5 minutes, and the C-F peak absorbance of the medium after it was immersed was obtained again, so as to obtain the bonded ratio based on the absorbance before and after the immersion.

The coefficients of dynamic friction $\mu_I$, $\mu_L$, CSS-$\mu_I$, CSS-$\mu_L$ were obtained in the following manner. Initially, a magnetic head with a head load of 10 gf was caused to slide above the surface of each of the above examples of magnetic recording media at a radial position of 21.5 mm, with the medium rotating at speed of 1 rpm, and the coefficient of dynamic friction $\mu_I$ was measured during the sliding movement. After the magnetic head slid above the recording medium at a rotating speed of 100 rpm for one hour, the coefficient of dynamic friction $\mu_L$ was measured at a rotating speed of 1 rpm. Then, the magnetic recording medium was installed in an actual magnetic disc drive, and the coefficient of dynamic friction $\mu_I$ (represented as CSS-$\mu_I$) was measured. After the CSS operation was repeated for 200 hours under conditions of 60° C. and 80% RH, the coefficient of dynamic friction $\mu_L$ (represented as CSS-$\mu$L) was measured, and contamination of the magnetic head was observed.

The migration test was conducted in the following manner. Initially, each of the above examples (Examples 1 through 60, Comparative Examples 1 through 18) of magnetic recording media was installed in a magnetic disc drive, and kept rotated at a high speed of 7200 rpm for 240 hours, under conditions of 80° C. and 30% RH. The thickness between opposite surfaces of the magnetic recording medium before and after the high-speed rotation was measured at a radially inner position of r=20 mm, and at the radially outermost position of r=45 mm, and the amount of an increase in the thickness measured at the radially outer position with respect to that measured at the radially inner position after the sliding motion was measured. The results of the measurement are indicated in TABLE 1 through TABLE 4.

As is apparent from TABLE 1 through TABLE 4, the coefficients of dynamic friction $\mu_L$ and CSS-$\mu_L$ were relatively low, and no contamination of the head was observed, with respect to the magnetic recording media (Examples 1 through 60) each coated with the perfluoropolyether liquid lubricant having a weak alkaline tertiary amine functional group as an end group functional group of chain molecule. In particular, the recording media that were subjected to heat treatment or UV treatment after coating of the lubricant for increasing the proportion of the bonded lubricant were far less likely to undergo migration caused by spinning off the lubricant during high-speed rotation of the disc, as compared with the recording media using known lubricants. Consequently, the coefficients of dynamic friction $\mu_L$ and CSS-$\mu_L$ were remarkably reduced.

If the molecular weight of the known perfluoropolyether liquid lubricant is too large (Mw is equal to or greater than 5500), the adsorption effect of the polar functional group is relatively weakened, thereby causing a problem of adhesion of the magnetic head to the lubricant layer of the recording medium. The perfluoropolyether liquid lubricant having tertiary amine at an end(s) of chain molecule, on the other hand, shows a far stronger bonding strength with the carbon protective layer, as compared with the known lubricants, and therefore the molecular weight may be controlled to within a wide range of 1500 to 15000, without causing the problem of adhesion of the head to the magnetic disc. Also, the magnetic medium of the invention is less likely to wear when used with a low-fly-height contact head, thus assuring desirable lubricating capability.

To measure the amount of adhesion of $SO_2$, each of the above examples (Examples 1 through 60, Comparative Examples 1 through 18) of magnetic recording media was left for 24 hours with 0.1 ppm of gas being generated, within a $SO_2$ permeation tube system of a standard gas generator "PERMEATOR" available from Gastech Co., Ltd., and a $SO_2$ component adsorbed onto the surface of the disc after it was left in the gas was quantified by ion chromatography.

As is apparent from TABLE 1 through TABLE 4, the perfluoropolyether liquid lubricant having tertiary amine at an end(s) of chain molecule is more intensely bonded to and covers active adhesion sites present on the surface of the carbon protective layer, as compared with known lubricants, and therefore an acid gas, such as $SO_2$, which causes external gas contamination is prevented from being adsorbed onto the surface of the recording medium, with a result of reduction in the amount of adhesion of $SO_2$. It was also found that this effect becomes more obvious due to improvement of the bonded state of the lubricant through the heating treatment or UV irradiation treatment.

On the other hand, magnetic recording media coated only with a conventional liquid lubricant containing end group alcohol-modified perfluoropolyether or end group piperonyl-modified perfluoroether having alcohol or piperonyl at an end of chain molecule suffer from large spin migration due to an influence of a poor bonded state of the lubricant. As a result, the coefficients of dynamic friction $\mu_I$ and $CSS\text{-}\mu_L$ are increased, and the magnetic head used with such recording medium is contaminated due to transfer of the lubricant or deposition of contaminants, as is apparent from TABLE 4.

TABLE 1 - A

| Lubricant | Molecular weight | Example | Bonded ratio No post treatment | Heating | UV | Coeff. of dynamic friction $\mu_I$ | Coeff. of dynamic friction $\mu_L$ |
|---|---|---|---|---|---|---|---|
| pyrimidinyl piperazine-modified perfluoro-polyether (II) | 1500 | 1 | 32% | | | 0.35 | 0.40 |
| | | 2 | | 70% | | 0.29 | 0.33 |
| | | 3 | | 100% | | 0.30 | 0.35 |
| | | 4 | | | 70% | 0.28 | 0.33 |
| | | 5 | | | 100% | 0.29 | 0.34 |
| | 4000 | 6 | 35% | | | 0.36 | 0.39 |
| | | 7 | | 70% | | 0.27 | 0.35 |
| | | 8 | | 100% | | 0.28 | 0.35 |
| | | 9 | | | 70% | 0.26 | 0.35 |
| | | 10 | | | 100% | 0.27 | 0.37 |
| | 8000 | 11 | 40% | | | 0.37 | 0.41 |
| | | 12 | | 70% | | 0.33 | 0.36 |
| | | 13 | | 100% | | 0.34 | 0.38 |
| | | 14 | | | 70% | 0.34 | 0.37 |
| | | 15 | | | 100% | 0.33 | 0.37 |
| | 15000 | 16 | 45% | | | 0.39 | 0.42 |
| | | 17 | | 70% | | 0.35 | 0.39 |
| | | 18 | | 100% | | 0.34 | 0.39 |
| | | 19 | | | 70% | 0.35 | 0.40 |
| | | 20 | | | 100% | 0.36 | 0.40 |

TABLE 1-B

| Example | $CSS\text{-}\mu_I$ | $CSS\text{-}\mu_L$ | Head contamination | Increase of OD film thickness due to migration | Amount of adsorption of $SO_2$ $\mu g/m^2$ |
|---|---|---|---|---|---|
| 1 | 0.27 | 0.46 | None | 1.4 Å | 2.3 |
| 2 | 0.25 | 0.36 | None | 0.7 Å | 1.8 |
| 3 | 0.25 | 0.37 | None | 0.4 Å | 1.4 |
| 4 | 0.23 | 0.38 | None | 0.5 Å | 1.7 |
| 5 | 0.24 | 0.37 | None | 0.3 Å | 1.2 |
| 6 | 0.27 | 0.44 | None | 1.2 Å | 1.9 |
| 7 | 0.22 | 0.36 | None | 0.4 Å | 1.4 |
| 8 | 0.24 | 0.36 | None | 0.3 Å | 1.0 |
| 9 | 0.22 | 0.35 | None | 0.4 Å | 1.2 |
| 10 | 0.23 | 0.34 | None | 0.2 Å | 0.9 |
| 11 | 0.28 | 0.47 | None | 0.9 Å | 1.5 |
| 12 | 0.26 | 0.38 | None | 0.2 Å | 0.8 |
| 13 | 0.27 | 0.39 | None | 0.3 Å | 0.4 |
| 14 | 0.28 | 0.37 | None | 0.1 Å | 0.8 |
| 15 | 0.27 | 0.38 | None | 0.2 Å | 0.3 |
| 16 | 0.30 | 0.48 | None | 0.9 Å | 1.0 |
| 17 | 0.28 | 0.41 | None | 0.2 Å | 0.6 |
| 18 | 0.29 | 0.40 | None | 0.1 Å | 0.3 |
| 19 | 0.30 | 0.38 | None | 0.2 Å | 0.5 |
| 20 | 0.31 | 0.40 | None | 0.2 Å | 0.2 |

TABLE 2 - A

| Lubricant | Molecular weight | Example | Bonded ratio No post treatment | Heating | UV | Coeff. of dynamic friction $\mu_I$ | Coeff. of dynamic friction $\mu_L$ |
|---|---|---|---|---|---|---|---|
| piperidinyl ethylamine-modified perfluoro-polyether (III) | 1500 | 21 | 30% | | | 0.36 | 0.43 |
| | | 22 | | 70% | | 0.29 | 0.35 |
| | | 23 | | 100% | | 0.31 | 0.35 |
| | | 24 | | | 70% | 0.30 | 0.36 |
| | | 25 | | | 100% | 0.31 | 0.37 |
| | 4000 | 26 | 32% | | | 0.37 | 0.40 |
| | | 27 | | 70% | | 0.26 | 0.34 |
| | | 28 | | 100% | | 0.28 | 0.36 |
| | | 29 | | | 70% | 0.25 | 0.34 |
| | | 30 | | | 100% | 0.26 | 0.36 |
| | 8000 | 31 | 40% | | | 0.39 | 0.44 |
| | | 32 | | 70% | | 0.34 | 0.38 |
| | | 33 | | 100% | | 0.34 | 0.37 |
| | | 34 | | | 70% | 0.34 | 0.39 |
| | | 35 | | | 100% | 0.33 | 0.36 |
| | 15000 | 36 | 45% | | | 0.43 | 0.47 |
| | | 37 | | 70% | | 0.36 | 0.42 |
| | | 38 | | 100% | | 0.37 | 0.43 |
| | | 39 | | | 70% | 0.37 | 0.43 |
| | | 40 | | | 100% | 0.38 | 0.44 |

TABLE 2-B

| Example | $CSS\text{-}\mu_I$ | $CSS\text{-}\mu_L$ | Head contamination | Increase of OD film thickness due to migration | Amount of adsorption of $SO_2$ $\mu g/m^2$ |
|---|---|---|---|---|---|
| 21 | 0.28 | 0.48 | None | 1.6 Å | 3.3 |
| 22 | 0.24 | 0.34 | None | 1.1 Å | 2.5 |
| 23 | 0.26 | 0.36 | None | 0.5 Å | 2.3 |
| 24 | 0.25 | 0.38 | None | 0.9 Å | 2.3 |
| 25 | 0.26 | 0.39 | None | 0.6 Å | 2.0 |
| 26 | 0.27 | 0.43 | None | 1.4 Å | 2.7 |
| 27 | 0.23 | 0.37 | None | 0.9 Å | 2.2 |
| 28 | 0.24 | 0.36 | None | 0.6 Å | 1.9 |
| 29 | 0.23 | 0.36 | None | 0.8 Å | 1.8 |
| 30 | 0.25 | 0.36 | None | 0.6 Å | 1.8 |
| 31 | 0.29 | 0.47 | None | 1.4 Å | 2.4 |
| 32 | 0.25 | 0.39 | None | 0.8 Å | 1.5 |
| 33 | 0.28 | 0.41 | None | 0.6 Å | 1.7 |
| 34 | 0.30 | 0.40 | None | 0.6 Å | 1.6 |
| 35 | 0.29 | 0.39 | None | 0.5 Å | 1.2 |
| 36 | 0.33 | 0.48 | None | 1.2 Å | 1.5 |
| 37 | 0.29 | 0.42 | None | 0.7 Å | 1.1 |
| 38 | 0.29 | 0.43 | None | 0.3 Å | 0.8 |
| 39 | 0.30 | 0.41 | None | 0.5 Å | 0.9 |
| 40 | 0.31 | 0.40 | None | 0.3 Å | 0.9 |

TABLE 3-A

| Lubricant | Molecular weight | Example | Bonded ratio No post treatment | Heating | UV | Coeff. of dynamic friction $\mu_I$ | Coeff. of dynamic friction $\mu_L$ |
|---|---|---|---|---|---|---|---|
| diethyl-amine-modified perfluoropolyether (IV) | 1500 | 41 | 30% | | | 0.36 | 0.43 |
| | | 42 | | 70% | | 0.31 | 0.35 |
| | | 43 | | 100% | | 0.33 | 0.39 |
| | | 44 | | | 70% | 0.31 | 0.35 |
| | | 45 | | | 100% | 0.34 | 0.38 |
| | 4000 | 46 | 34% | | | 0.39 | 0.41 |
| | | 47 | | 70% | | 0.29 | 0.36 |
| | | 48 | | 100% | | 0.30 | 0.35 |
| | | 49 | | | 70% | 0.29 | 0.37 |
| | | 50 | | | 100% | 0.28 | 0.35 |
| | 8000 | 51 | 40% | | | 0.40 | 0.42 |
| | | 52 | | 70% | | 0.35 | 0.38 |
| | | 53 | | 100% | | 0.37 | 0.40 |
| | | 54 | | | 70% | 0.33 | 0.41 |
| | | 55 | | | 100% | 0.34 | 0.39 |
| | 15000 | 56 | 46% | | | 0.43 | 0.45 |
| | | 57 | | 70% | | 0.38 | 0.42 |
| | | 58 | | 100% | | 0.37 | 0.44 |
| | | 59 | | | 70% | 0.36 | 0.44 |
| | | 60 | | | 100% | 0.37 | 0.45 |

TABLE 3-B

| Example | CSS-$\mu_I$ | CSS-$\mu_L$ | Head contamination | Increase of OD film thickness due to migration | Amount of adsorption of $SO_2$ $\mu g/m^2$ |
|---|---|---|---|---|---|
| 41 | 0.29 | 0.47 | None | 1.4 Å | 2.6 |
| 42 | 0.25 | 0.35 | None | 0.8 Å | 2.1 |
| 43 | 0.25 | 0.38 | None | 0.7 Å | 1.9 |
| 44 | 0.24 | 0.40 | None | 0.6 Å | 1.7 |
| 45 | 0.24 | 0.39 | None | 0.4 Å | 1.3 |
| 46 | 0.28 | 0.46 | None | 1.2 Å | 2.3 |
| 47 | 0.22 | 0.38 | None | 0.6 Å | 1.8 |
| 48 | 0.23 | 0.37 | None | 0.5 Å | 1.7 |
| 49 | 0.21 | 0.36 | None | 0.5 Å | 1.6 |
| 50 | 0.23 | 0.35 | None | 0.5 Å | 1.4 |
| 51 | 0.28 | 0.49 | None | 1.0 Å | 2.0 |
| 52 | 0.27 | 0.40 | None | 0.4 Å | 1.5 |
| 53 | 0.29 | 0.40 | None | 0.5 Å | 1.5 |
| 54 | 0.29 | 0.39 | None | 0.3 Å | 1.3 |
| 55 | 0.29 | 0.39 | None | 0.2 Å | 1.1 |
| 56 | 0.33 | 0.51 | None | 1.2 Å | 1.5 |
| 57 | 0.31 | 0.46 | None | 0.4 Å | 0.9 |
| 58 | 0.30 | 0.45 | None | 0.3 Å | 0.8 |
| 59 | 0.32 | 0.40 | None | 0.3 Å | 0.8 |
| 60 | 0.33 | 0.41 | None | 0.3 Å | 0.6 |

TABLE 4 - A

| Lubricant | Molecular weight | Comp. Example | Bonded ratio No post treatment | Heating | UV | Coeff. of dynamic friction $\mu_I$ | Coeff. of dynamic friction $\mu_L$ |
|---|---|---|---|---|---|---|---|
| end group alcohol-modified perfluoropolyether | 1500 | 1 | 18% | | | 0.36 | 0.52 |
| | | 2 | | 60% | | 0.34 | 0.49 |
| | | 3 | | | 60% | 0.29 | 0.33 |
| | 4000 | 4 | 21% | | | 0.37 | 0.54 |
| | | 5 | | 60% | | 0.34 | 0.47 |
| | | 6 | | | 60% | 0.33 | 0.45 |
| | 8000 | 7 | 25% | | | 0.41 | 0.65 |
| | | 8 | | 60% | | 0.37 | 0.49 |
| | | 9 | | | 60% | 0.38 | 0.50 |
| end group piperonyl-modified perfluoropolyether | 1500 | 10 | 17% | | | 0.35 | 0.50 |
| | | 11 | | 60% | | 0.31 | 0.46 |
| | | 12 | | | 60% | 0.30 | 0.47 |
| | 4000 | 13 | 22% | | | 0.33 | 0.50 |
| | | 14 | | 60% | | 0.30 | 0.47 |
| | | 15 | | | 60% | 0.29 | 0.45 |
| | 8000 | 16 | 27% | | | 0.38 | 0.60 |
| | | 17 | | 60% | | 0.35 | 0.57 |
| | | 18 | | | 60% | 0.37 | 0.55 |

TABLE 4-B

| Comp. Example | CSS-$\mu_I$ | CSS-$\mu_L$ | Head contamination | Increase of OD film thickness due to migration | Amount of adsorption of $SO_2$ $\mu g/m^2$ |
|---|---|---|---|---|---|
| 1 | 0.30 | 0.60 | Yes | 8.8 Å | 5.3 |
| 2 | 0.28 | 0.54 | Yes | 7.0 Å | 3.5 |
| 3 | 0.23 | 0.38 | Yes | 6.6 Å | 3.0 |
| 4 | 0.29 | 0.55 | Yes | 8.0 Å | 3.8 |
| 5 | 0.28 | 0.57 | Yes | 5.3 Å | 2.9 |
| 6 | 0.27 | 0.56 | Yes | 4.8 Å | 3.0 |
| 7 | 0.33 | 0.69 | Yes | 7.6 Å | 3.1 |
| 8 | 0.29 | 0.60 | Yes | 3.8 Å | 2.3 |
| 9 | 0.29 | 0.58 | Yes | 2.8 Å | 2.0 |
| 10 | 0.32 | 0.58 | Yes | 7.9 Å | 5.0 |
| 11 | 0.26 | 0.51 | Yes | 6.9 Å | 3.6 |
| 12 | 0.25 | 0.48 | Yes | 6.5 Å | 3.3 |
| 13 | 0.28 | 0.52 | Yes | 7.2 Å | 4.2 |
| 14 | 0.27 | 0.54 | Yes | 5.8 Å | 2.9 |
| 15 | 0.27 | 0.53 | Yes | 5.5 Å | 3.0 |
| 16 | 0.30 | 0.61 | Yes | 6.8 Å | 3.5 |
| 17 | 0.30 | 0.58 | Yes | 5.4 Å | 2.3 |
| 18 | 0.29 | 0.57 | Yes | 5.3 Å | 1.9 |

As explained above, the present invention provides a novel perfluoropolyether liquid lubricant which has a cyclic tertiary amine functional group having π electrons, as a functional group at an end or ends of a chain molecule. The present invention also provides a magnetic recording medium obtained by coating a surface of a carbon protective layer with this lubricant, with a remarkably increased bonding strength between the lubricant and the surface of the carbon protective layer. The thus obtained liquid lubricant and magnetic recording medium of the invention yields the following effects.

(1) The adhesion of the magnetic head to the magnetic recording medium (fly-stiction) due to transfer of the lubricant onto the magnetic head is less likely to occur, which would be otherwise caused by reduction in the fly height of the magnetic head or changes in the magnetic head structure for satisfying a recent demand for high density recording. Also, spin migration is less likely to occur, and the lubricant is prevented from moving or dissipating toward a radially outer portion of the medium during high-speed rotation of the magnetic medium.

(2) Various phenomena caused by reduction in the bonding force between the lubricant and the carbon protective layer at a high temperature and a high humidity are less likely to occur, and the lubricant shows a stable lubricating characteristic for a prolonged time. The various phenomena caused by reduction in the bonding force include acceleration of deposition of a harmful contamination component of the gas within the disc drive, occurrence of corrosion, and head crush caused by decomposition of the lubricant.

(3) After the surface of the carbon protective layer is coated with a perfluoropolyether liquid lubricant having a function group to which a substitutional group showing weak alkalinity and having a conjugated bond is given, heat treatment or UV irradiation may be additionally conducted so as to further increase the bonding strength between the coated surface and the lubricant layer, so that the proportion of the bonded lubricant is controlled to a desired value within a range of 30 to 100%. As a result, the adhesion of the head (fly-stiction) is further prevented, and spin migration and deposition of gas contamination can be sufficiently reduced. Consequently the lubricating property and the durability can be improved.

What is claimed is:

1. A magnetic recording medium comprising:

a magnetic layer;

a carbon protective layer formed on said magnetic layer; and a liquid lubricant layer formed on said carbon protective layer, said liquid lubricant layer being formed of the perfluoropolyether liquid lubricant;

wherein the liquid lubricant includes a main chain structure which is represented by one selected from a group consisting of general formulas (1), (2) and (3), said perfluoropolyether having a tertiary amine functional group at at least one end of a chain molecule, said general formula (1) being expressed by:

$$R^1H_2C-(CF_2CF_2O)_m-(CF_2O)_n-CH_2R^2 \quad (1)$$

where $R^1$ and $R^2$ are the same functional group or different functional groups, and each of m and n is an integer, said general formula (2) being expressed by:

$$F(CF_2CF_2CF_2O)_m-CH_2R^3 \quad (2)$$

where $R^3$ is a functional group, and m is an integer, said general formula (3) being expressed by:

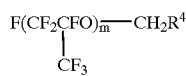

where $R^4$ is a functional group, and m is an integer.

2. A magnetic recording medium as defined in claim 1, wherein said amine functional group has a tertiary amine structure represented by one of formula (4) and formula (5), and shows a weak basicity, said formula (4) being expressed by

where $R^5$ and $R^6$ are the same functional group or different functional groups, and $R^5$ and $R^6$ may be bonded to each other to form a cycle, while n is 0 or an integer, said formula (5) being expressed by:

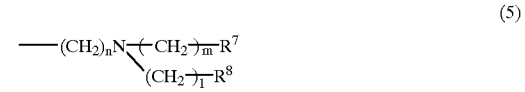

where $R^7$ and $R^8$ are the same functional group or different functional groups, and $R^7$ and $R^8$ may be bonded to each other to form a cycle, while each l, m, n is 0 or an integer.

3. A magnetic recording medium as defined in claim 1, wherein said amine functional group is a functional group containing at least one selected from a group consisting of aromatic ring, aromatic amine, aromatic diamine, heterocycle, heterocyclic amine, alicyclic hydrocarbon, alicyclic amine and aliphatic amine.

4. A magnetic recording medium as defined in claim 1, wherein the perfluoropolyether liquid lubricant has a weight average molecular weight of 1500 to 15000.

5. A magnetic recording medium as defined in claim 1, wherein the perfluoropolyether liquid lubricant contains a bonded perfluoropolyether lubricant that is strongly bonded to said carbon protective layer, and a mobile lubricant that is weakly bonded to the carbon protective layer, said bonded perfluoropolyether lubricant being contained in a proportion of 30 to 100% with respect to a total amount of the lubricant.

6. A method for manufacturing a magnetic recording medium comprising the steps of:

forming a Cr under-coating layer on a non-magnetic base by sputtering;

forming a Co alloy magnetic layer on the Cr under-coating layer;

forming a carbon protective layer on the Co alloy magnetic layer by sputtering or CVD;

coating a surface of the carbon protective layer with a perfluoropolyether liquid lubricant by dipping or spin coating; and heating or irradiating with ultraviolet rays the surface of the carbon protective layer that has been coated with the liquid lubricant;

wherein the liquid lubricant includes a main chain structure which is represented by one selected from a group consisting of general formulas (1), (2) and (3), said perfluoropolyether having a tertiary amine functional group at at least one end of a chain molecule, said general formula (1) being expressed by:

$$R^1H_2C-(CF_2CF_2O)_m-(CF_2O)_n-CH_2R^2 \quad (1)$$

where $R^1$ and $R^2$ are the same functional group or different functional groups, and each of m and n is an integer, said general formula (2) being expressed by:

$$F(CF_2CF_2CF_2O)_m-CH_2R^3 \quad (2)$$

where $R^3$ is a functional group, and m is an integer, said general formula (3) being expressed by:

where $R^4$ is a functional group, and m is an integer.

* * * * *